Feb. 6, 1934.  W. S. SMITH ET AL  1,946,337
MANUFACTURE OF SUBMARINE OR OTHER SIGNALING CABLES
Filed Jan. 2, 1931
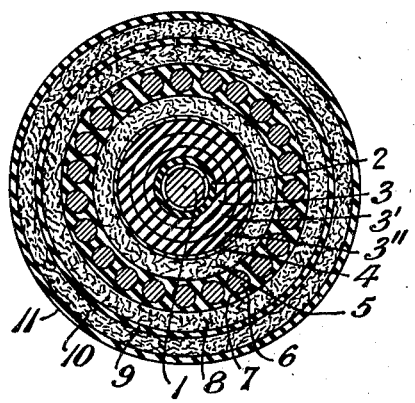
INVENTORS,
W. S. Smith,
H. J. Garnett and
J. N. Dean,
BY THEIR ATTORNEYS, Patented Feb. 6, 1934

1,946,337

UNITED STATES PATENT OFFICE 1,946,337

MANUFACTURE OF SUBMARINE OR OTHER SIGNALING CABLES

Willoughby Statham Smith, Benchams, Newton Poppleford, Henry Joseph Garnett, Lymne, Solefields, Sevenoaks, and John Norman Dean, Orpington, England Application January 2, 1931, Serial No. 506,306, and in Great Britain January 8, 1930

5 Claims. (Cl. 173—264)

This invention relates to the manufacture of submarine or other signaling cables insulated with gutta percha, balata and the like or their substitutes, and more particularly such cables which incorporate a preparation derived from coal tar for preservative or other purposes.

It is common practice in the manufacture of e. g. submarine cables, to treat the outer servings of jute or hemp with coal tar to preserve them. It is also well known that it is necessary to free the tar used for this purpose from its more volatile constituents, as the latter have a harmful effect upon the gutta percha insulation, rendering it in the course of time sticky.

It has now been found that the acid and basic constituents remaining in the tar after the more volatile constituents have been removed have a harmful effect upon the electrical properties of the gutta percha or the like.

According to the present invention submarine or other signaling cables in which there is insulation of gutta percha, balata, rubber or other like thermoplastic materials or mixtures thereof or preparations therefrom with or without additional ingredients and in which a composition being or comprising a preparation derived from coal tar is used, e. g. for coating or impregnating the servings of the cable, so that the insulation is subjected to its influence, are manufactured using as such composition one whose coal tar constituents are substantially free from acid and basic components as well as from the more volatile components of coal tar whereby the harmful effect on the insulation is prevented or reduced.

The acid is of a phenolic nature and the tar bases are amino-bodies of the aromatic series as will appear from a consideration of the temperatures hereinafter given.

One way of removing these undesirable acid and basic constituents from the tar is to subject the tar to steam distillation. This treatment, however, removes not only these undesirable constituents but also at the same time useful oils of a harmless nature, with the result that after treatment with steam, the tar has thickened until in some cases it sets to a hard and brittle solid at sea-bottom temperatures. Such tar is, of course, useless for impregnating the jute or hemp servings, as it would tend to make the cable inflexible. A further disadvantage is that it is extremely difficult to remove the basic substances from the tar completely by this method.

Another way of removing the acidic and basic constituents is by treating the tar first with an alkali to combine with the acidic bodies, washing thoroughly with water to remove the salts thus formed, together with any excess of alkali, and then treating the tar with acid to combine with the basic bodies and finally washing again with water to remove the salts and excess of acid.

The disadvantages of this method are that in the first place it is very difficult to wash the tar thoroughly with water as, especially in the presence of alkali, there is a tendency for the mixture to form an emulsion, and in the second place when sulphuric acid is used in the removal of the basic substances, it is very liable to sulphonate the tar yielding products that are highly undesirable for the purposes of protection.

Tar for use in accordance with this invention may be prepared by subjecting the tar to a distillation at a temperature sufficient to distil off the useful oils, which oil containing portion of the distillate is collected and subjected to a separate treatment to remove the acidic and basic impurities, when the purified oil is returned to the original body of tar which is then ready for use.

In the preferred method, the purified tar is obtained by first removing the more volatile constituents by distillation in the usual way, then continuing the distillation until the harmful acidic and basic substances have been removed. The oily part of the distillate, which, in order to maintain the naphthalene content as low as possible, should not be collected below 225–230° C., is now treated first with an alkali and then with an acid with intermediate and final washings, as described above, and is finally returned to the body of the pitch. It will be found that distillation can conveniently be stopped at about 300–315° C.

It has been found that another very suitable preparation consists substantially of anthracene oil and pitch, in which the anthracene oil is first washed with acid and alkali to remove tar bases and acids. The anthracene oil is obtained by collecting the distillate between about 275–315° C., or according to usual practice.

The ratio of the contents of anthracene oil to pitch will vary according to the quality of the tar from which the constituents have been obtained, and the temperature to which the still was taken before discontinuing the distillation of the oil.

Suitable proportions are from about 10 to 30% of anthracene oil, and the remainder pitch.

The viscosity of the resulting tar will vary according to the requirements, and these will in turn depend, for example, upon the temperature to which the cable is to be submitted.

A tar with the following analysis has been found very suitable.

| | |
|---|---|
| Specific gravity | 1.2 |
| Viscosity | 15–25 secs. (Hutchinson) |
| Naphthalene | nil |
| Tar acids | 0.2 |
| Tar bases | 0.15 |
| Ammonia | nil |
| Moisture | substantially nil |

Distillate:

| | |
|---|---|
| 0–170° C | 0.4 |
| 170–200° C | 0.4 |
| 200–230° C | 0.7 |
| 230–270° C | 3.0 |
| 270–300° C | 5.5 |
| Pitch | 90.0 |

The methods used for the analysis are according to 'Standard Methods for Testing Tar and its Products', published by the Standardization of Tar Products Tests Committee, December, 1929.

Tars so treated are suitable for general use in the protective coatings or 'cable compounds' of submarine signaling cables or of any cables where gutta percha, balata or the like or their substitutes, e. g. rubber or purified rubber and their mixtures with wax and/or any thermoplastic material suitable for insulation purposes, is used. For example the jute may be impregnated with the treated tar or with compositions in which the tar proportion consists of the treated tar.

It was formerly believed that the preservative action of tar was due to the presence therein of phenolic bodies. Recent tests have proved, however, that tar from which all water-soluble bodies, including the phenols, have been removed has its preservative action enhanced, probably owing to the fact that its water-absorbing power is thereby greatly diminished. Tar refined by the improved method described above will therefore show enhanced protective properties towards the jute, and has no harmful action on the gutta percha.

Examples

*Method of testing.*—Samples of the tar before and after treatment were placed in separate vessels and a measured length of core having a gutta percha insulation was suspended over the tar in each vessel. A similar core placed in another vessel containing no tar was used as a control. The vessels were now sealed and allowed to remain for a number of days. The dielectric resistance of each piece of core was measured before and after suspension over the tar.

Example 1

*Steam-blown Tar*

Before suspension over the tar, all the samples had substantially identical dielectric resistances in water at 75° F. After being suspended over the tar for 14 days, the following changes were found to have occurred in the dielectric resistance in water at 75° F. of the gutta percha:—

Core from the vessel with:—

| No tar. | Untreated tar | Treated tar |
|---|---|---|
| 8% rise | 10% drop | 5% rise |

Example 2

*Acid and base-freed tar*

Before suspension over the tar, all the samples had substantially identical dielectric resistances in water at 75° F. After being suspended over the tar for 20 days, the following changes were found to have occurred in the dielectric resistance in water at 75° F. of the gutta percha:—

Core from the vessel with:—

| No tar | Untreated tar | Treated tar |
|---|---|---|
| 10% rise | 12% drop | 9.5% rise |

In some cases it may be desirable to refine the tar still further by removing the so-called "free carbon." This may be done by any known method, for example by filtration hot through cloth or metal cloth with or without the use of a filter aid.

The invention is illustrated in the accompanying drawing which shows a cross section of a submarine cable constructed in accordance with the invention.

In the drawing, 1 indicates the core comprising a central conductor and loading next to which is a layer indicated at 2 of Chatterton's compound. Surrounding the layer 2 are three layers 3, 3' and 3" of gutta percha insulation over which insulation is wound a brass teredo tape 4. On the outside of the teredo tape 4 is a layer of tarred jute 5 surrounding which are armor wires 6. The remaining layers consist of an inner layer of compound 7, a layer of tarred jute 8, an intermediate layer of compound 9, another layer of tarred jute 10, and finally an outer or closing layer 11 of compound.

The special tar can be used to advantage in layers 7, 8, 9, 10 and 11. It may be stiffened, if necessary, with such substances as pitch in order to obtain compounds of suitable stiffness and rigidity.

What we claim is:—

1. In a signaling cable, conducting means, a thermoplastic insulation for said conducting means embodying gutta percha or the equivalent, and a coal tar containing body in said cable in proximity to said gutta percha insulation so that the latter is subjected to its influence, the coal tar being substantially free from acid and basic components as well as the more volatile components.

2. In a signaling cable, conducting means, a thermoplastic insulation prepared from gutta percha, and servings treated with coal tar in said cable in proximity to said insulation so that the latter is subjected to the influence of the coal tar, the coal tar being substantially free from acid and basic components as well as the more volatile components.

3. In a signaling cable, conducting means, a thermoplastic insulation prepared from gutta percha, and servings coated or impregnated with coal tar in said cable in proximity to said insulation so that the latter is subjected to the influence of the coal tar, the coal tar being substantially free from acid and basic components as well as the more volatile components.

4. A signaling cable as claimed in claim 1 in which the tar is substantially a mixture of anthracene oil substantially free from acid and basic components as well as the more volatile components, and pitch.

5. A signaling cable as claimed in claim 1 in which the tar is substantially a mixture of 10 to 30% anthracene oil substantially free from acid and basic components as well as the more volatile components, and pitch.

WILLOUGHBY STATHAM SMITH.
HENRY JOSEPH GARNETT.
JOHN NORMAN DEAN.